US012717443B2

(12) United States Patent
Floricica Voicu

(10) Patent No.: US 12,717,443 B2
(45) Date of Patent: Aug. 25, 2026

(54) TOUCH SYSTEM FAIL-OPERATIONAL OUTPUT SYSTEMS AND METHODS

(71) Applicant: NXP USA, INC., Austin, TX (US)

(72) Inventor: Aurelian Floricica Voicu, Ploiesti (RO)

(73) Assignee: NXP USA, Inc., Austin, TX (US)

(*) Notice: Subject to any disclaimer, the term of this patent is extended or adjusted under 35 U.S.C. 154(b) by 0 days.

(21) Appl. No.: 18/932,886

(22) Filed: Oct. 31, 2024

(65) Prior Publication Data

US 2026/0064224 A1 Mar. 5, 2026

(30) Foreign Application Priority Data

Aug. 30, 2024 (RO) ............................... a 202400503

(51) Int. Cl.
*G06F 3/041* (2006.01)
*B60K 35/10* (2024.01)

(52) U.S. Cl.
CPC ............ *G06F 3/0418* (2013.01); *B60K 35/10* (2024.01); *B60K 2360/1438* (2024.01)

(58) Field of Classification Search
CPC ........................ B60K 35/10; B60K 2360/1438
USPC .................................................. 345/173–174
See application file for complete search history.

(56) References Cited

U.S. PATENT DOCUMENTS 9,846,509 B2 12/2017 Mosier et al.
10,020,995 B2 * 7/2018 Ricci ...................... G08C 19/00
10,079,839 B1 * 9/2018 Bryan .................... G05B 15/02
11,789,565 B2 * 10/2023 Parikh .................. G06F 1/1641 345/173
2018/0210608 A1 7/2018 Park et al.
2020/0101844 A1 * 4/2020 Miller, Jr. .......... G06Q 30/0265
2021/0165530 A1 6/2021 Aoki et al.
2021/0334645 A1 * 10/2021 Pardeshi ................ G06N 3/045
2022/0413675 A1 12/2022 Gray et al.
2023/0161443 A1 * 5/2023 Ziraknejad ............. B66B 1/461 327/517

FOREIGN PATENT DOCUMENTS

DE 102021103173 A1 * 8/2021 ............. G01R 31/50
GB 2561649 A 10/2018

OTHER PUBLICATIONS

Cohen, Stanley et al.; "MODBUS/TCP controller for the power supplies in als BTS beam line"; 2007 IEEE Particle Accelerator Conference (PAC); Jun. 25-29, 2007, Albuquerque, NM; DOI: 10.1109/PAC.2007.4440233.

(Continued)

*Primary Examiner* — Kwin Xie

(57) ABSTRACT

Systems, methods, and circuits are described herein that may be configured to receive sensor data from one or more sensors at a processing unit of a touch system and at a bypass control logic circuit of the touch system. The processor unit may include an input coupled to the one or more sensors and an output coupled to a downstream device. The systems, methods, and circuit may be configured to determine an error corresponding to the processing unit and, in response to determining the error, selectively activate the bypass control logic circuit to provide the sensor data to the downstream device, bypassing the processing unit.

20 Claims, 10 Drawing Sheets

(56) References Cited

OTHER PUBLICATIONS

Ebrahimzadeh, Amin et al.; "Delay-Constrained Teleoperation Task Scheduling and Assignment for Human +Machine Hybrid Activities Over FiWi Enhanced Networks"; IEEE Transactions on Network and Service Management ( vol. 16, Issue: 4, Dec. 2019); Date of Publication: Aug. 23, 2019; DOI: 10.1109/TNSM.2019.2937020.

Guy, Paul et al.; "Transformer Asset Life Extension—When, Why and How to Apply Continuous Condition Monitoring Systems"; 2019 IEEE PES GTD Grand International Conference and Exposition Asia (GTD Asia); Mar. 19-23, 2019, Bangkok, Thailand; DOI: 10.1109/GTDAsia.2019.8715957.

* cited by examiner

TOUCH SYSTEM FAIL-OPERATIONAL OUTPUT SYSTEMS AND METHODS

CROSS-REFERENCE TO RELATED APPLICATIONS

This application claims the priority under 35 U.S.C. § 119 of Romania Patent application no. A202400503, filed on 30 Aug. 2024, the contents of which are incorporated by reference herein.

FIELD OF USE

The present disclosure generally relates to touch-sensitive input systems, and more particularly, to systems and methods of providing a fail-operational output from touch-based systems.

BACKGROUND

Conventional monolithic touch systems, such as touch-sensitive systems in automobiles, may include a sensor front end and one or more downstream signal processing blocks or circuits. The safety decomposition approach reveals that the processing block represents a signal point of failure for touch systems.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures and in the detailed description indicates similar or identical items or features.

Figure 1:
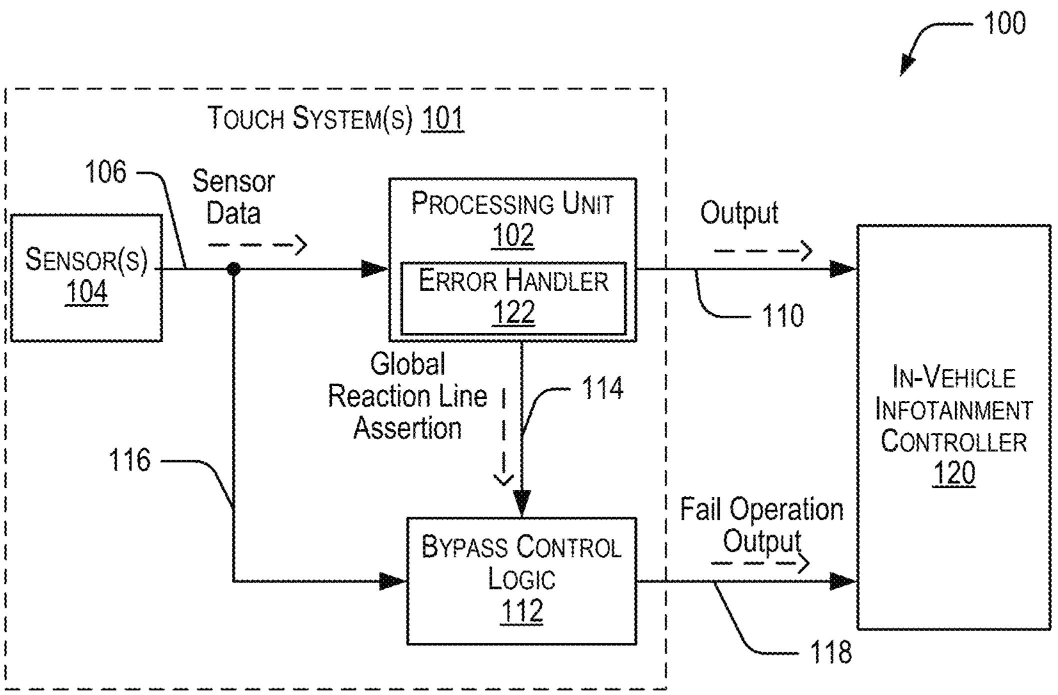
FIG. 1 depicts a block diagram of a system including an in-vehicle infotainment system coupled to one or more touch systems including bypass control logic circuit responsive to a signal from a processing unit of the touch system to selectively provide touch data to the in-vehicle system, in accordance with one or more embodiments.

While implementations are described in this disclosure by way of example, those skilled in the art will recognize that the implementations are not limited to the examples or figures described. Rather, the figures and detailed description thereto are not intended to limit implementations to the form disclosed, but instead the intention is to cover all modifications, equivalents, and alternatives falling within the spirit and scope as defined by the appended claims. The headings used in this disclosure are for organizational purposes only and are not meant to limit the scope of the description or the claims. As used throughout this application, the word "may" is used in a permissive sense (in other words, the term "may" is intended to mean "having the potential to") instead of in a mandatory sense (as in "must"). Similarly, the terms "include," "including," and "includes" mean "including, but not limited to."

DETAILED DESCRIPTION

Embodiments of circuits and methods are described below may include a bypass control logic circuit that can be selectively enabled to route touch data from one or more touch sensors to the in-vehicle infotainment system, bypassing a processing unit of the sensor system and enabling safety and integrity metrics without requiring additional safety measures. In one or more embodiments, the bypass control logic circuit may include an input configured to receive data from the one or more touch sensors, a second input to receive a signal, and an output coupled to the in-vehicle infotainment system. The bypass control logic circuit may be configured to selectively route data from the sensors to the in-vehicle infotainment system. The received signal may be received from the processing unit of the sensor system or from the in-vehicle infotainment system.

In one or more embodiments, the processing unit of the sensor system may be configured to determine a processing error and to generate a global safety reaction signal in response to the processing error. The bypass control logic circuit may be configured to provide the sensor data to the in-vehicle infotainment system in response to the global safety reaction signal.

In one or more embodiments, the processing unit of the sensor system may be configured to generate output signals, and the bypass control logic circuit may be configured to monitor the output signals from the processing unit to determine an error. In response to determining an error, the bypass control logic circuit may be configured to disable a connection between the output of the processing unit and the in-vehicle infotainment system and may provide the sensor data from the bypass control logic circuit to the in-vehicle infotainment system.

In one or more embodiments, the bypass control logic circuit may receive a signal from the in-vehicle infotainment system. In response to the signal, the bypass control logic circuit may be configured to bypass the processing unit to provide data from the sensors to the in-vehicle infotainment system.

In one or more embodiments, the bypass control logic circuit may include an encoder configured to encode the data in a packet before sending the packet to the in-vehicle infotainment system. The packet may be an Ethernet packet (e.g., a packet as specified by the IEEE 802.11x standard) or a packet corresponding to another packet-based communication protocol. In one or more other embodiments, the encoder may be between the bypass control logic circuit and the in-vehicle infotainment system.

While the above examples mention touch systems, it should be understood that the bypass control logic circuit may be generalized for use in any edge node that has built-in analog front-end circuitry or sensor interfacing circuit blocks. An example of a system including the bypass control logic circuit is described below with respect to FIG. 1.

FIG. 1 depicts a block diagram of a system 100 including an in-vehicle infotainment system coupled to one or more touch systems 101 including bypass control logic circuits 112 responsive to a signal from a processing unit 102 of the one or more touch systems 101 to selectively provide touch data to the in-vehicle system, in accordance with one or more embodiments. The system 100 may include one or more touch systems 101, each of which may include one or more sensors 104 coupled to a processing unit 102, which may be coupled to an in-vehicle infotainment (IVI) controller 120 or other downstream processing component. In one or more embodiments, the IVI controller 120 may be part of a larger in-vehicle infotainment system. In addition to the IVI controller 120, the in-vehicle infotainment system may include a display, input/output (I/O) interfaces, speakers, and other components. In one or more embodiments, the I/O interfaces that may be coupled to various circuits, devices, buttons, knobs, or other components, which may be accessed by a user to control various functions of the in-vehicle infotainment system, such as to switch between inputs (e.g., radio, portable device, etc.), to adjust the volume, to switch between applications (e.g., radio, map, heating and air-conditioning), to configure settings, to access the clock, and so on. In one or more embodiments, the I/O interfaces may also be accessed to configure driving settings, such as autonomous driving controls, cruise control, lane assist settings, other controls, or any combination thereof. In one or more embodiments, the in-vehicle infotainment system may be coupled by the I/O interfaces to one or more touch systems 101, which may include touch-sensitive interfaces, to receive user inputs. The in-vehicle control system may include the IVI controller 120 coupled to the I/O interfaces to receive data related to the touch-sensitive interfaces or from the one or more buttons, knobs, devices, or other components and to selectively update the display or control operation of one or more circuits or components in response to the received data.

The touch system 101 may include a processing unit 102 that includes an input coupled to a node 106 to receive sensor data from one or more sensors 104, which are also coupled to the node 106. The processing unit 102 may be a microcontroller unit (MCU), a field-programmable gate array (FPGA), an application-specific integrated circuit (ASIC), a general-purpose processor, or other data processing unit configured to receive the sensor data, to provide output data to the IVI controller 120. The processing unit 102 may include an output coupled to a node 110, which may be coupled to the IVI controller 120.

The processing unit 102 may include a second output coupled to a node 114, which may be coupled to a bypass control logic circuit 112. The bypass control logic circuit 112 may include a first input coupled to the one or more sensors 104 via a node 116 to receive the sensor data, a second input coupled to the processing unit 102 via the node 114, and an output coupled to a node 118, which may be coupled to the IVI controller 120.

In one or more embodiments, the processing unit 102 may include an error handler 122 that may be configured to detect data errors and optionally to detect errors or faults in a processing core of the processing unit. In one or more embodiments, the error handler 122 may determine errors, such as a data calculation error or a processor failure. In response to determining an error, the processing unit 102 may apply a global reaction line assertion to the node 114, activating the bypass control logic circuit 112. In response to receiving the global reaction line assertion via the node 114, the bypass control logic circuit 112 may be configured to translate the sensor data from the node 116 into a fail operation output, which can be further processed by the IVI controller 120 or another downstream device. In one or more embodiments, the fail operation output provided to the node 118 may include the sensor data assembled into a data packet, a data stream, a data frame, or other data communication protocol that may be accepted by the IVI controller 120.

In the illustrated embodiment, the bypass control logic circuit 112 may provide the fail operation output to the IVI controller 120. In one or more other embodiments, the bypass control logic circuit 112 may instead provide the fail operation output to a controller on a touch circuit board or to another processing device, which may consume the touch data.

While the above-example is directed to an in-vehicle infotainment system, the fail operation of the touch system 101 may be adapted to other systems, such as semi-autonomous robotic assistance systems. Such systems may utilize human input via teleoperation or via a touch interface. To prevent delay-based or processor failure-based operational errors, the fail operation of the touch system 101 may enable direct streaming of data from the sensors to the processing unit of the semi-autonomous robotic assistance system when a processing unit of the touch-sensitive system fails.

In the embodiment of FIG. 1, an error handler 122 within the processing unit 102 determined the error or fault and triggered (enabled) the bypass control logic circuit 112 to provide the sensor data to the IVI controller 120, bypassing the processing unit 102. In some embodiments, the bypass control logic circuit 112 may monitor the output at the node 110 to determine a data error or fault. An embodiment in which the bypass control logic circuit monitors the output is described below with respect to FIG. 2.

Figure 2:
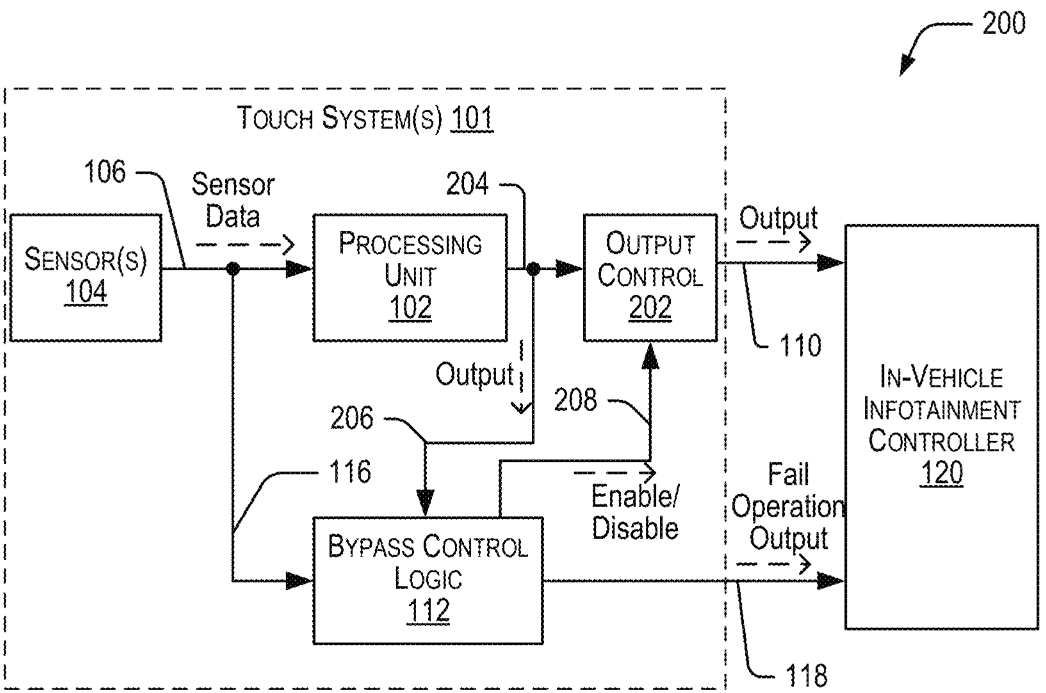
FIG. 2 depicts a block diagram of a system including an in-vehicle infotainment system coupled to one or more touch systems including bypass control configured to selectively provide touch data to the in-vehicle system in response to output data of a processing unit of the touch system, in accordance with one or more embodiments.

FIG. 2 depicts a block diagram of a system 200 including an IVI controller 120 coupled to one or more touch systems 101 including the bypass control logic circuit 112 configured to selectively provide touch data to the IVI controller 120 in response to output data of a processing unit 102 of the touch system 101, in accordance with one or more embodiments. In this embodiment, the system 200 may include all the elements of the system 100 of FIG. 1 and may include an output control circuit 202 between the processing unit 102 and the node 110, which is coupled to the IVI controller 120. In one or more embodiments, the output control circuit 202 may include a switch (such as a transistor) or another component configured to selectively couple the node 204 to the node 110. While the node 114 between the processing unit 102 and the bypass control logic circuit 112 is not shown, in one or more embodiments, the system 200 may include the node 114.

In the illustrated embodiment, the output of the processing unit 102 may be coupled to a node 204. The output control circuit 202 may include an input coupled to the node 204, a control input coupled to the bypass control logic circuit 112 by a node 208 to receive an enable or disable signal, and an output coupled to the node 110 to provide the output signal to the IVI controller 120. In this embodiment, when the processing unit 102 is operating correctly, the output control circuit 202 may pass the output from the processing unit 102 to the node 110.

In one or more embodiments, the bypass control logic circuit 112 may include a first input coupled to the node 116 to receive the sensor data from the one or more sensors and a second input coupled to a node 206, which may be coupled to the output of the processing unit 102 at the node 204. The bypass control logic circuit 112 may include an output coupled to the node 118 and a second output coupled to the node 208, which is coupled to the output control circuit 202. In one or more embodiments, the bypass control logic circuit 112 may also include an input coupled to the node 114 (as shown in FIG. 1), other inputs, other outputs, or any combination thereof. The bypass control logic circuit 112 may be configured to monitor the output of the processing unit 102 for any timeouts in the output stream of the processing unit 102. In this example, a timeout may indicate a period (time window) in which the output stream from the processing unit 102 includes no data, which may indicate an internal failure of the processing unit. In response to determining a timeout that exceeds a threshold value, the bypass control logic circuit 112 may be configured to apply a disable signal to the node 208 to disable the output control 202 to decouple the processing unit 102 from the node 110. Additionally, the bypass control logic circuit 112 may provide a fail operation output signal to the node 118, which is coupled to the IVI controller 120. The fail operation output may include the sensor data from the one or more sensors 104.

In one or more embodiments, the bypass control logic circuit 112 may continue to monitor the output at the node 204 until the processing unit 102 resumes its normal operation. Upon determining the processing unit 102 is functioning, the bypass control logic circuit 112 may enable the output control 202 to couple the node 204 to the node 110, allowing the output from the processing unit 102 to be provided to the IVI controller 120.

In one or more embodiments, the bypass control logic circuit 112 may format or pack the sensor data into a communication stream, which can be consumed by a downstream device. The communication stream may be provided as the fail operation output to the downstream device, which may be the IVI controller 120 (as shown), a main controller of a touch board, another processing device, or the like.

While the embodiment of FIG. 2 describes an embodiment in which the bypass control logic circuit 112 may monitor the output of the processing unit 102 or may receive a control signal from the processing unit 102 via the node 114 (as shown in FIG. 1), the bypass control logic circuit 112 may be configured to receive a trigger signal from a downstream device, such as the IVI controller 120 or another processing device. An embodiment of a bypass control logic circuit 112 that is responsive to a trigger signal is described below with respect to FIG. 3.

Figure 3:
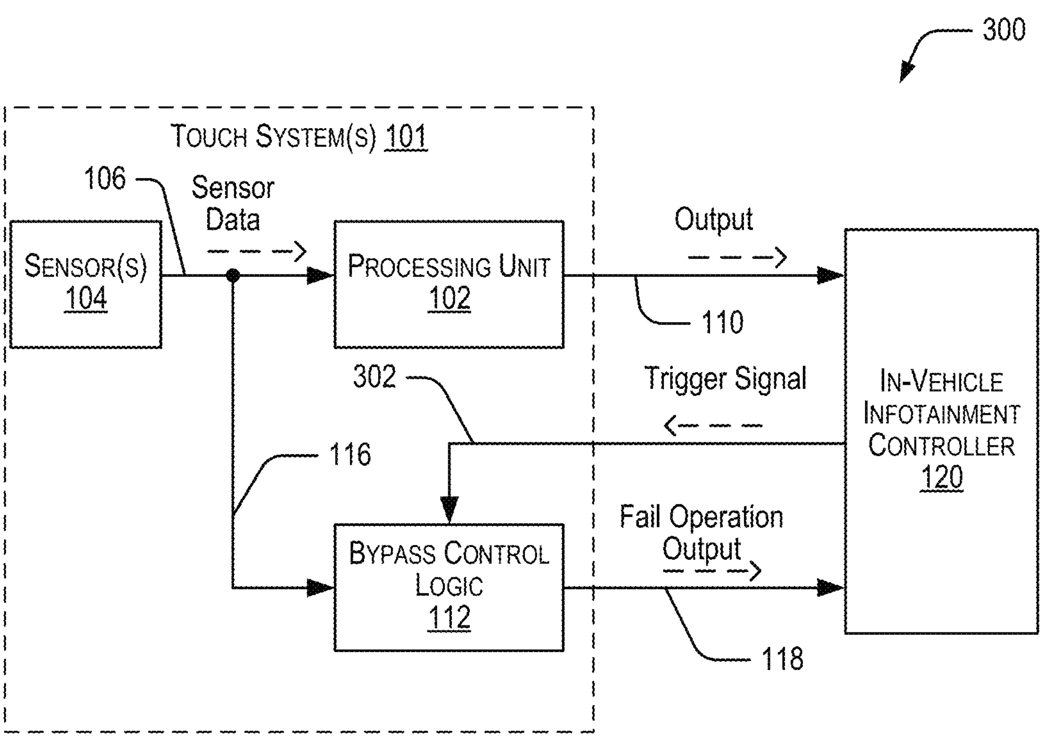
FIG. 3 depicts a block diagram of a system including an in-vehicle infotainment system coupled to one or more touch systems including bypass control configured to selectively provide touch data to the in-vehicle system in response to a trigger signal from the in-vehicle infotainment system, in accordance with one or more embodiments.

FIG. 3 depicts a block diagram of a system 300 including an IVI controller 120 coupled to one or more touch systems 101 including the bypass control logic circuit 112 configured to selectively provide touch data to the IVI controller 120 in response to a trigger signal, in accordance with one or more embodiments. The system 300 may include all the elements of the system 100 of FIG. 1, system 200 of FIG. 2, or any combination thereof.

In the illustrated example, the bypass control logic circuit 112 may include a first input coupled to the node 116 to receive the sensor data from the one or more sensors 104, a second input coupled to a node 302 to receive a trigger signal, and an output coupled to the node 118, which may be coupled to the IVI controller 120. In one or more embodiments, the bypass control logic circuit 112 may also include an input coupled to the node 114 (as shown in FIG. 1), an input coupled to the node 206 (as shown in FIG. 2), an output coupled to the node 208 (as shown in FIG. 2), other inputs, other outputs, or any combination thereof. In one or more embodiments, the node 302 may be coupled to the IVI controller 120 or to another component that is downstream from the touch systems 101.

In one or more embodiments, the bypass control logic circuit 112 may receive a trigger signal at the input coupled to the node 302. In response to the trigger signal, the bypass control logic circuit 112 may be configured to format or pack the sensor data into a communication stream, which can be consumed by a downstream device. The communication stream may be provided as the fail operation output to the downstream device, which may be the IVI controller 120 (as shown), a main controller of a touch board, another processing device, or the like.

In one or more embodiments, the trigger signal may be controlled or asserted by a downstream device, such as the IVI controller 120 or another downstream device (not shown), which may detect an abnormality in the output of the processing unit 102. In response to determining the error, the downstream device may decide to ignore the output from the processing unit 102 and may leverage the output of the bypass control logic circuit 112 by asserting the trigger signal. In one or more embodiments, the bypass control logic circuit 112 may disable the output control 202 to decouple the processing unit 102 from the IVI controller 120 and may monitor the output of the processing unit at the node 204 (as in FIG. 2).

The bypass control logic circuit 112 may be implemented in various ways. In one or more embodiments, the output of the bypass control logic circuit 112 may be coupled to a data encoder, which may be configured to format or pack the sensor data into a communication stream. An illustrative embodiment of the bypass control logic circuit 112 is described below with respect to FIG. 4A.

Figure 4A:
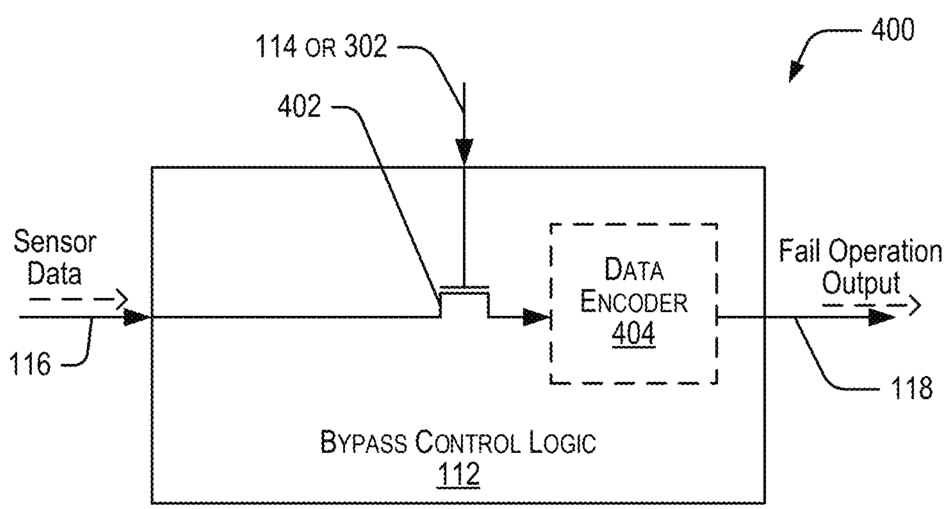
FIG. 4A depicts a block diagram of an embodiment of the bypass control logic circuit of FIG. 1 or 3, in accordance with one or more embodiments.

FIG. 4A depicts a block diagram of an embodiment 400 of the bypass control logic circuit 112 of FIG. 1 or 3, in accordance with one or more embodiments. In this example embodiment, the bypass control logic circuit 112 may include an input coupled to the node 116 to receive the sensor data and an output coupled to the node 118 to selectively provide the fail operation output signal to one or more downstream devices, such as the IVI controller 120.

The bypass control logic circuit 112 may include a switch 402 including a first terminal coupled to the node 116, a control terminal coupled to the node 114 (FIG. 1) or the node 302 (FIG. 3), and a second terminal coupled to the node 118. The switch 402 may be implemented as a metal oxide semiconductor field effect transistor (MOSFET), a bipolar junction transistor (BJT), or another switch. In one or more embodiments, the second terminal of the switch 402 may be connected to the node 118. When activated, the switch 402 may provide a signal path between the first terminal and the second terminal to provide the sensor data from the node 116 to the node 118. The sensor data may be provided as a raw data stream or may be encoded by the data encoder circuit 404, which may format or pack the sensor data into one of a data frame or a data packet for transmission to the downstream device. In one or more embodiments, the bypass control logic circuit 112 may include the data encoder circuit 404 or may have an output coupled to the data encoder circuit 404, which may be coupled to the node 118.

In this embodiment, a signal asserted by the processing unit 102 on the node 114 or a trigger signal asserted on the node 302 by a downstream component (such as the IVI controller 120) may selectively activate the switch 402 to allow the sensor data to be provided to the node 118, bypassing the processing unit 102. In one or more embodiments, as long as the global reaction line signal or trigger signal is asserted, the switch 402 may be enabled, and the processing unit 102 may be bypassed. When the processing unit 102 stops asserting the global reaction line signal or the downstream component stops asserting the trigger signal, the switch 402 may be deactivated, and the output of the processing unit 102 may be provided to the node 110.

In the illustrated embodiment, the bypass control logic circuit 112 is responsive to an asserted signal on nodes 114 or 302 to bypass the processing unit 102. However, in one or more other embodiments, in response to an asserted signal, the bypass control logic circuit 112 may be configured to perform one or more operations to determine whether to bypass the processing unit 102. An example of an embodiment of the bypass control logic circuit 112 that selectively bypasses the processing unit 102 in response to a timeout that exceeds a threshold time or count is described below with respect to FIG. 4B.

Figure 4B:
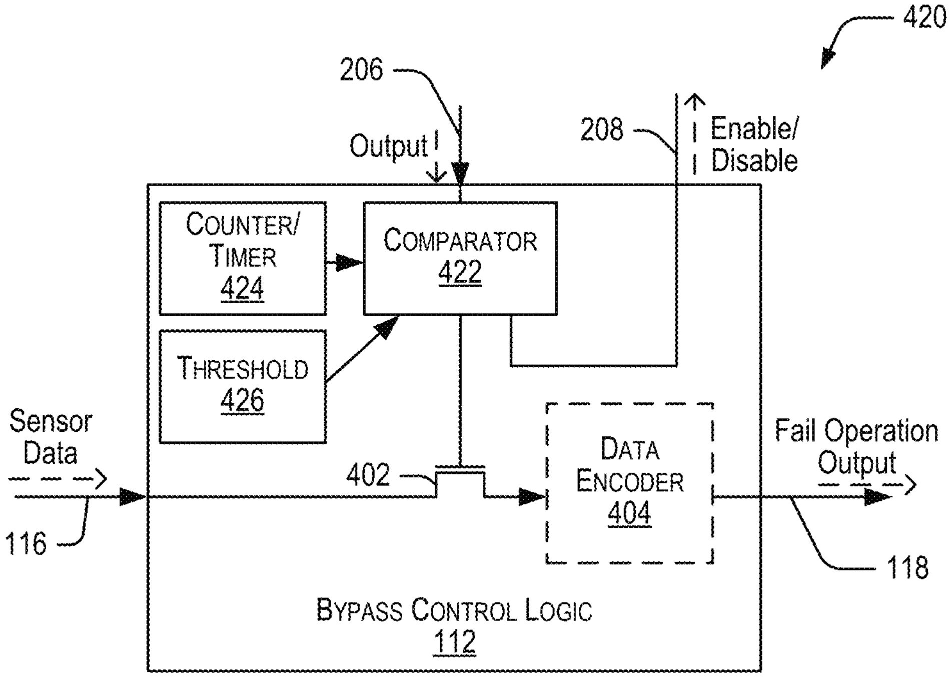
FIG. 4B depicts a block diagram of an embodiment of the bypass control logic circuit of FIG. 2, in accordance with one or more embodiments.

FIG. 4B depicts a block diagram of an embodiment 420 of the bypass control logic circuit 112 of FIG. 2, in accordance with one or more embodiments. In the illustrated embodiment, the bypass control logic circuit 112 may include the switch 402 and the data encoder circuit 404 as described with respect to FIG. 4A, except that the control terminal of the switch 402 may be coupled to the output of a comparator 422 instead of the nodes 114 or 302.

The bypass control logic circuit 112 may include the comparator 422 including an enable input coupled to the node 206, a first input coupled to a counter or timer circuit 424, a second input configured to receive a threshold value 426, and an output coupled to the control terminal of the switch 402 and to the node 208. The node 208 may be coupled to the output control circuit 202 in FIG. 2.

In one or more embodiments, in response to the output of the processing unit 102 at the node 204 remaining static (unchanging), the comparator 422 may be activated and may reset the counter or timer 424, which may start incrementing a count or time. The comparator 422 may compare the count or time to a threshold value 426. When the count or time exceeds the threshold value 426, the comparator 422 may include a first output coupled to the node 208 to provide a first signal and may include a second output coupled to the control terminal of the switch 402 to provide a second signal. In response to the first signal, the output control circuit 202 may decouple the output of the processing unit 102 from the node 110. In response to the second signal, the switch 402 may provide a signal path between the first terminal and the second terminal, providing the sensor data from the node 116 to the data encoder circuit 404 or to the node 118 to communicate the sensor data as the fail operation output to one or more downstream devices, such as the IVI controller 120. The fail operation output may include raw sensor data, a data frame, a data packet, or other formatted data for communication to the downstream device.

It should be understood that the circuits 400 and 420 depicted in FIGS. 4A and 4B are illustrative only and are not intended to be limiting. Further, it should be appreciated that the circuits 400 and 420 are not mutually exclusive, and the circuits may be combined using logic circuits. In an example, the control terminal of the switch 402 may be coupled to an output of a logical OR gate, which may include a first input coupled to the node 114, a second input coupled to the node 302, and a third input coupled to the second output of the comparator 422. In such an example, the implementations depicted in FIGS. 1-3 could be combined to allow for the bypass operation to be initiated by the processing unit 102, by the bypass control logic circuit 112, or by a downstream device, such as the IVI controller 120 or another downstream processing component or even a main controller of a touch sensor circuit board. An example of an embodiment combining the functionality of the systems 100, 200, and 300 of FIGS. 1-3 is described below with respect to FIG. 5.

Figure 5:
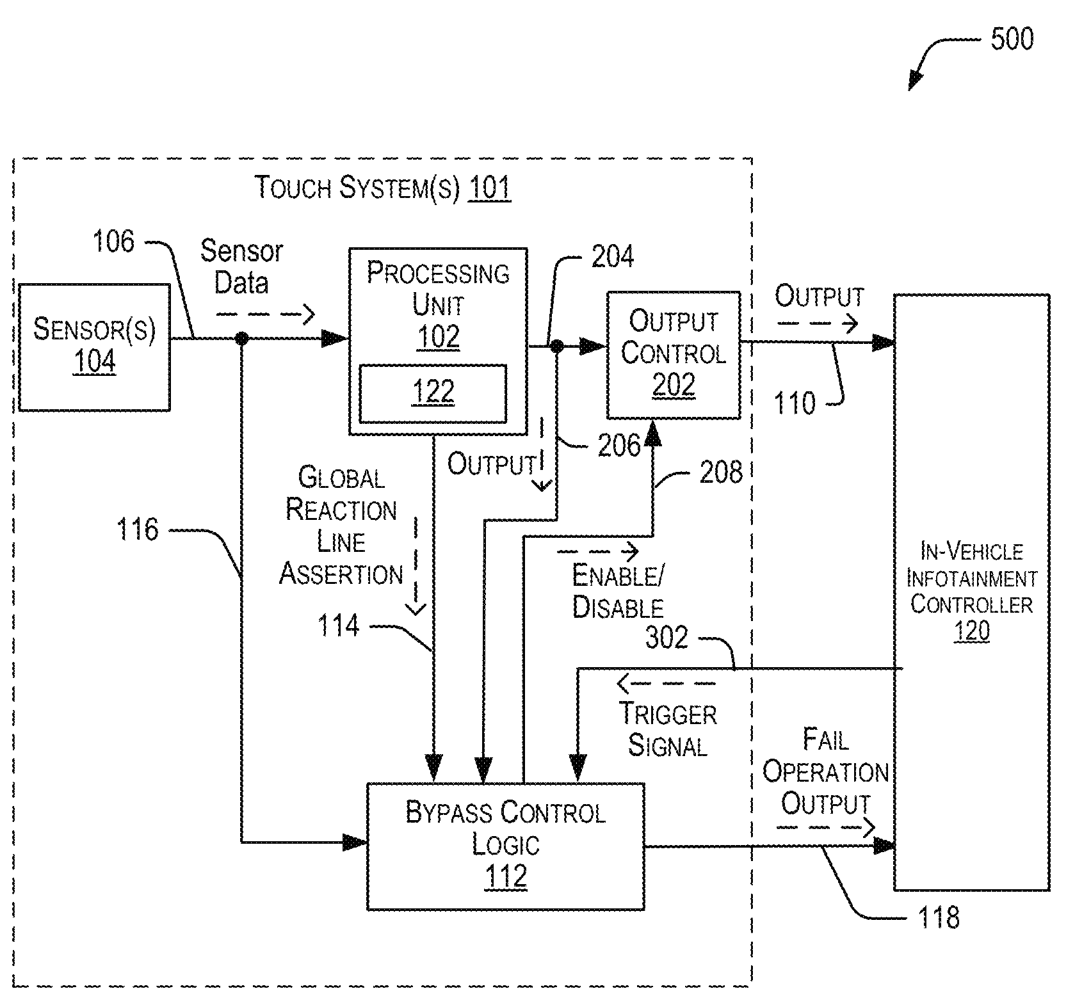
FIG. 5 depicts a block diagram of an embodiment of a system including the bypass control logic circuit including the elements of FIGS. 1-3, in accordance with one or more embodiments.

FIG. 5 depicts a block diagram of an embodiment of a system 500 including the bypass control logic circuit 112 including the elements of FIGS. 1-3, in accordance with one or more embodiments. In the illustrated embodiment, the bypass control logic circuit 112 may include a first input coupled to the error handler 122 of the processing unit 102 via the node 114, a second input coupled to the output of the processing unit 102 by the node 206, a third input coupled to the node 302, which may be coupled to a downstream device, such as the IVI controller 120, and an output coupled to the output control circuit 202

In the illustrated example, the bypass control logic circuit 112 may be activated by the error handler 122 determining an error, by a trigger signal asserted by the downstream device (e.g., IVI controller 120), or by the bypass control logic circuit 112 determining a timeout. Further, while the decoupling of the processing unit 102 from the downstream device was described with respect to the system 200 of FIG. 2 in response to the bypass control logic circuit 112 determining the error, in one or more embodiments, the bypass control logic circuit 112 may be configured to disable the output control 202 to decouple the processing unit 102 from the downstream device in response to the trigger signal at the node 302 or in response to the error handler asserting the global reaction line assertion on node 114. Other event triggers may also be used to activate the bypass control logic circuit 112.

Figure 6:
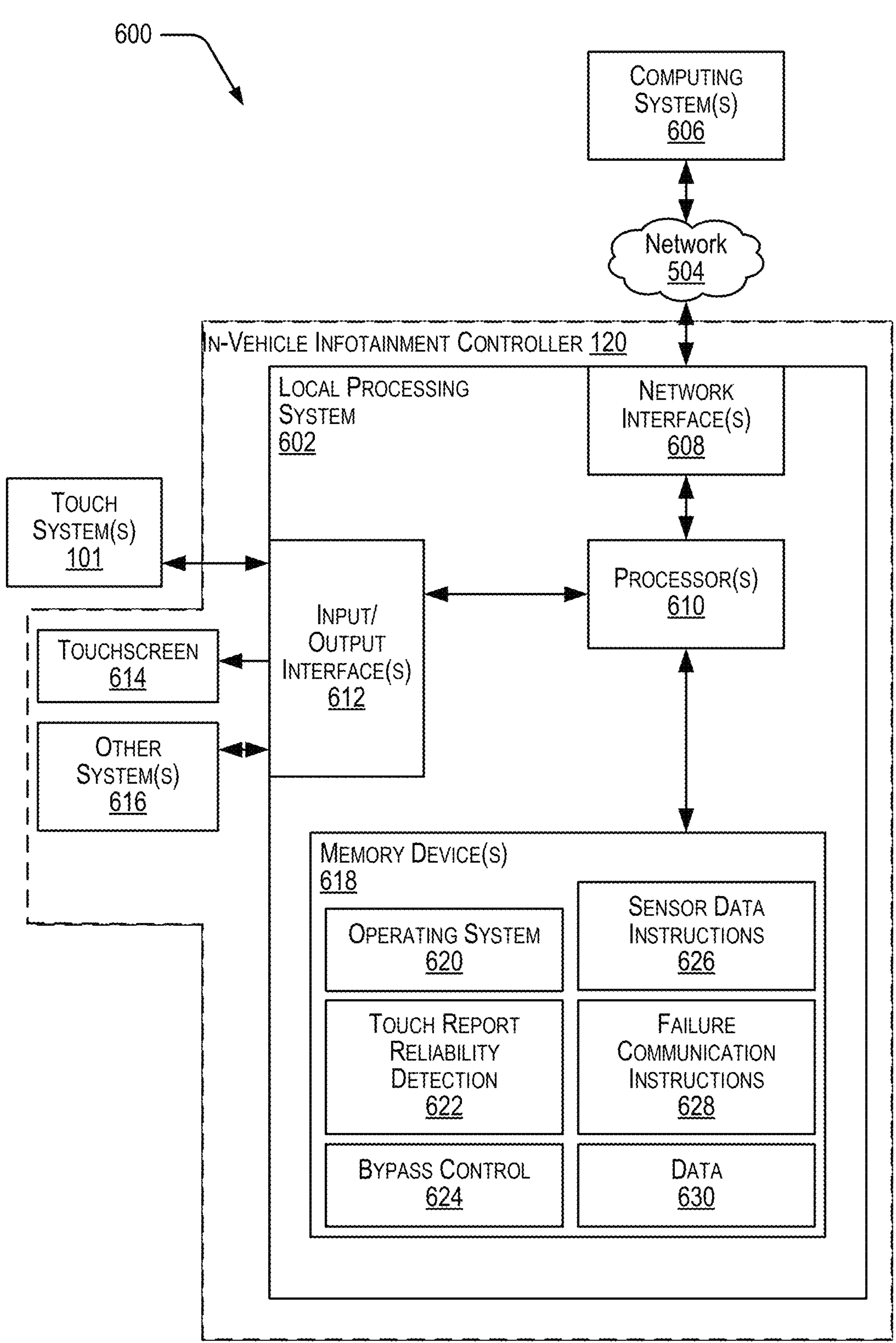
FIG. 6 depicts a block diagram of a system including an in-vehicle infotainment system coupled to one or more touch systems and communicatively coupled to one or more computing systems through a communications network, in accordance with one or more embodiments.

FIG. 6 depicts a block diagram of a system 600 including an IVI controller 120 coupled to one or more touch systems 101 and communicatively coupled to one or more computing systems 606 through a communications network 604, in accordance with one or more embodiments. The computing systems 606 may include one or more computer servers or network computing devices. The network 604 may include the Internet, a vehicular communications network, a cellular or digital communications network, other communications networks, or any combination thereof.

The IVI controller 120 may include a local processing system 602 including one or more network interfaces 608 configured to communicate data to and to receive data from the network 604. The local processing system 602 may include one or more processors 610 coupled to the one or more network interfaces 608. The one or more processors 610 may be configured to execute processor-readable instructions to perform various operations. The local processing system 602 may include one or more input/output (I/O) interfaces 612, which may be coupled to the one or more processors 610. The I/O interfaces 612 may be coupled to a touchscreen 614, which may include a display and a touch-sensitive interface configured to display information and to receive user inputs. The I/O interfaces 612 may be coupled to the one or more touch systems 101 and to one or more other systems 616, such as temperature sensors, tire pressure sensors, fluid sensors, diagnostic sensors, other sensors, other systems, or any combination thereof.

The local processing system 602 may include one or more memory devices 618 coupled to the one or more processors 610. The memory devices 618 may include a hard disc drive, a solid-state memory device, a flash memory device, other non-volatile memory devices, or any combination thereof. The one or more memory devices 618 may be configured to store data and to store processor-readable instructions that may be executed by the one or more processors 610.

The memory devices 618 may include operating system instructions 620 that may be executed by the processors 610 to control operation of various elements and to perform various system operations, such as receiving data and communicating data. The memory devices 618 may include touch report reliability detection instructions 622 that, when executed, may cause the one or more processors 610 to determine the reliability of touch sensor data received by the local processing system 602. In one or more embodiments, the touch report reliability detection instructions 622 may cause the one or more processors 610 to analyze received sensor data and to determine error data based on the sensor data.

The memory devices 618 may include bypass control instructions 624 that may cause the one or more processors 610 to generate or assert a trigger signal on the node 302 via the I/O interfaces 612 to selectively activate the bypass control logic circuit 112 of one or more of the touch systems 101. In one or more embodiments, the bypass control instructions 624 cause the one or more processors 610 to generator or assert the trigger signal when the one or more processors 610 determine errors that exceed one or more thresholds based on execution of the touch report reliability detection instructions 622.

The memory devices 618 may include sensor data instructions 626 that may cause the one or more processors 610 to process data received from the one or more touch systems 101. In one or more embodiments, the sensor data instructions 626 may cause the one or more processors 610 to process the fail operation output signals to extract the sensor data and to process the sensor data to determine touch data indicative of a control instruction or user selection.

The memory devices 618 may include failure communication instructions 628 that may cause the one or more processors 610 to communicate failure events to one or more computing system 606 through the network 604. Alternatively, or in addition, the failure communication instructions 628 may cause the one or more processors 610 to generate an output or alert to the touchscreen 614 for display to the user. The memory devices 618 may store data 630, such as error data, touch data, settings, other data, or any combination thereof.

In one or more embodiments, the IVI controller 120 may be configured to use the local processing system 602 to determine touch data errors, to selectively control one or more of the touch systems 101 to bypass its processing unit 102 to provide the sensor data directly to the IVI controller 120, and to process the sensor data to determine the touch data. In one or more embodiments, the IVI controller 120 may update the display data on the touchscreen 614, alter operation of one or more other systems, or any combination thereof in response to determining the touch data.

Figure 7:
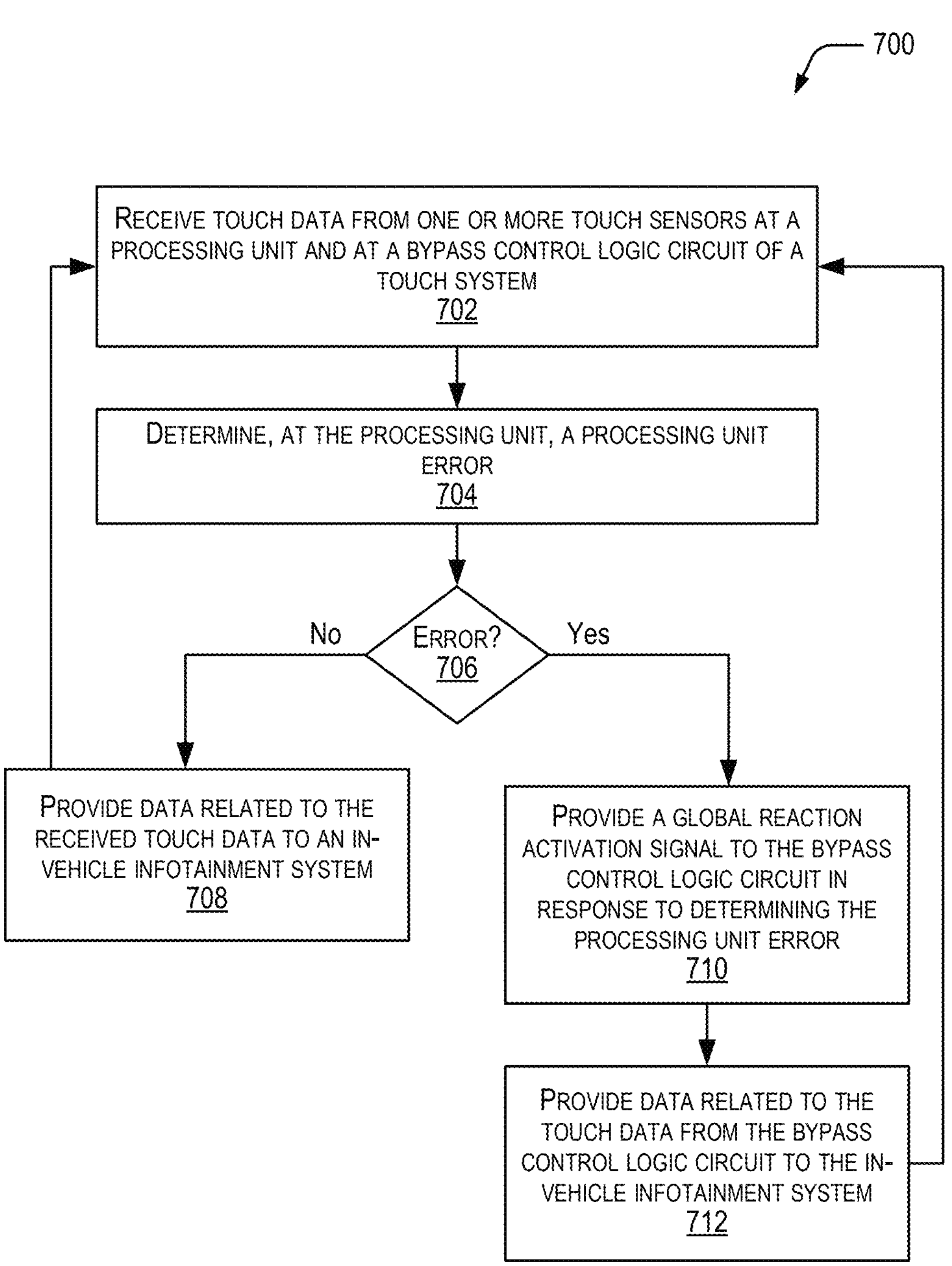
FIG. 7 depicts a block diagram of a method of bypassing a processing unit of a touch system in response to determining an error, in accordance with one or more embodiments.

FIG. 7 depicts a block diagram of a method 700 of bypassing a processing unit 102 of a touch system 101 in response to determining an error, in accordance with one or more embodiments. At 702, the method 700 may include receiving touch data from one or more sensors 104 at a processing unit 102 and at a bypass control logic circuit 112 of a touch system 101. The touch data may be sensor data provided by one or more sensors 104 to nodes 106 and 116 at the inputs to the processing unit 102 and the bypass control logic circuit 112, respectively.

At 704, the method 700 may include determining, at the processing unit 102, a processing unit error 704. In one or more embodiments, the processing unit 102 may include an error handler 122 configured to determine an error within the processing unit 102 and to selectively generate a global reaction line assertion signal at the node 114 to activate the bypass control logic circuit 112 when an error is determined.

At 706, if there is not an error, the method 700 may include providing data related to the received touch data to an in-vehicle infotainment system, at 708. The processing unit 102 may provide the sensor data from the sensors 104 to the node 110. The method 700 may then return to 702 to receive touch data from one or more touch sensors.

Otherwise, at 706, if there is an error, the method 700 may include providing a global reaction activation signal to the bypass control logic circuit 112 in response to determining the processing unit error, at 710. In one or more embodiments, the error handler 122 of the processing unit 102 may assert the global reaction activation signal on the node 114, which may activate the bypass control logic circuit 112. The global reaction activation signal may activate the switch 402 to couple the sensor data at the node 116 to the node 118.

At 712, the method 700 may include providing data related to the touch data from the bypass control logic circuit 112 to the in-vehicle infotainment system. In one or more embodiments, the bypass control logic circuit 112 may include a data encoder circuit 404 configured to format or pack the sensor data into a data frame, a data packet, or other format to provide a data stream to the IVI controller 120. The method 700 may then return to 702 to receive touch data from one or more touch sensors.

Figure 8:
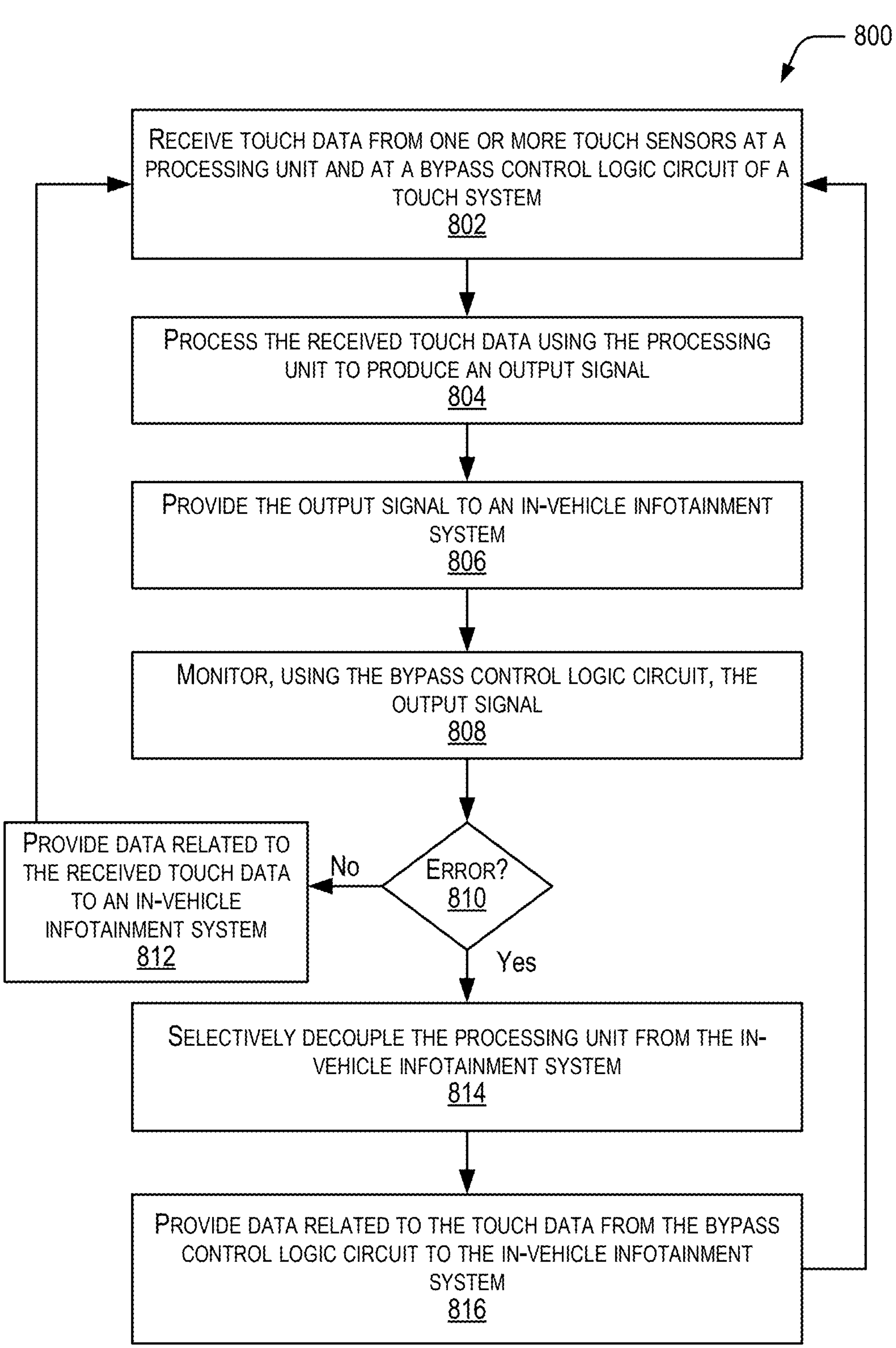
FIG. 8 depicts a block diagram of a method of bypassing a processing unit of a touch system in response to determining an error, in accordance with one or more embodiments.

FIG. 8 depicts a block diagram of a method 800 of bypassing a processing unit 102 of a touch system 101 in response to determining an error, in accordance with one or more embodiments. In this embodiment, the bypass control logic circuit 112 may determine the error and selectively bypass the processing unit 102.

At 802, the method 800 may include receiving touch data from one or more sensors 104 at a processing unit 102 and at a bypass control logic circuit 112 of a touch system 101. The touch data may be sensor data provided by one or more sensors 104 to nodes 106 and 116 at the inputs to the processing unit 102 and the bypass control logic circuit 112, respectively.

At 804, the method 800 may include processing the touch data using the processing unit 102 to produce an output signal. The processing unit 102 may provide the output signal to the node 204.

At 806, the method 800 may include providing the output signal to an in-vehicle infotainment system. In one or more embodiments, the output control circuit 202 may couple the node 204 to the node 110, which may be coupled to the IVI controller 120.

At 808, the method 800 may include monitoring, using the bypass control logic circuit 112, the output signal. The bypass control logic circuit 112 may include a comparator 422 that may be activated when the output signal of the processing unit 102 does not change or is at a pre-determined voltage level.

At 810, if there is not an error, the method 800 may include providing data related to the received touch data to an in-vehicle infotainment system, at 812. The processing unit 102 may provide the sensor data from the sensors 104 to the node 110. The method 800 may then return to 802 to receive touch data from one or more touch sensors.

Otherwise, if there is an error at 810, the method 800 may include selectively decoupling the processing unit 102 from the in-vehicle infotainment system, at 812. In one or more embodiments, the bypass control logic circuit 112 may be configured to disable the output control circuit 202 to decouple the processing unit 102 from the node 110, thereby decoupling the processing unit 102 from the IVI controller 120.

At 814, the method 800 may include providing data related to the touch data from the bypass control logic circuit 112 to the in-vehicle infotainment system. In one or more embodiments, the bypass control logic circuit 112 may include a data encoder circuit 404 configured to format or pack the sensor data into a data frame, a data packet, or other format to provide a data stream to the IVI controller 120. The method 800 may then return to 802 to receive touch data from one or more touch sensors.

Figure 9:
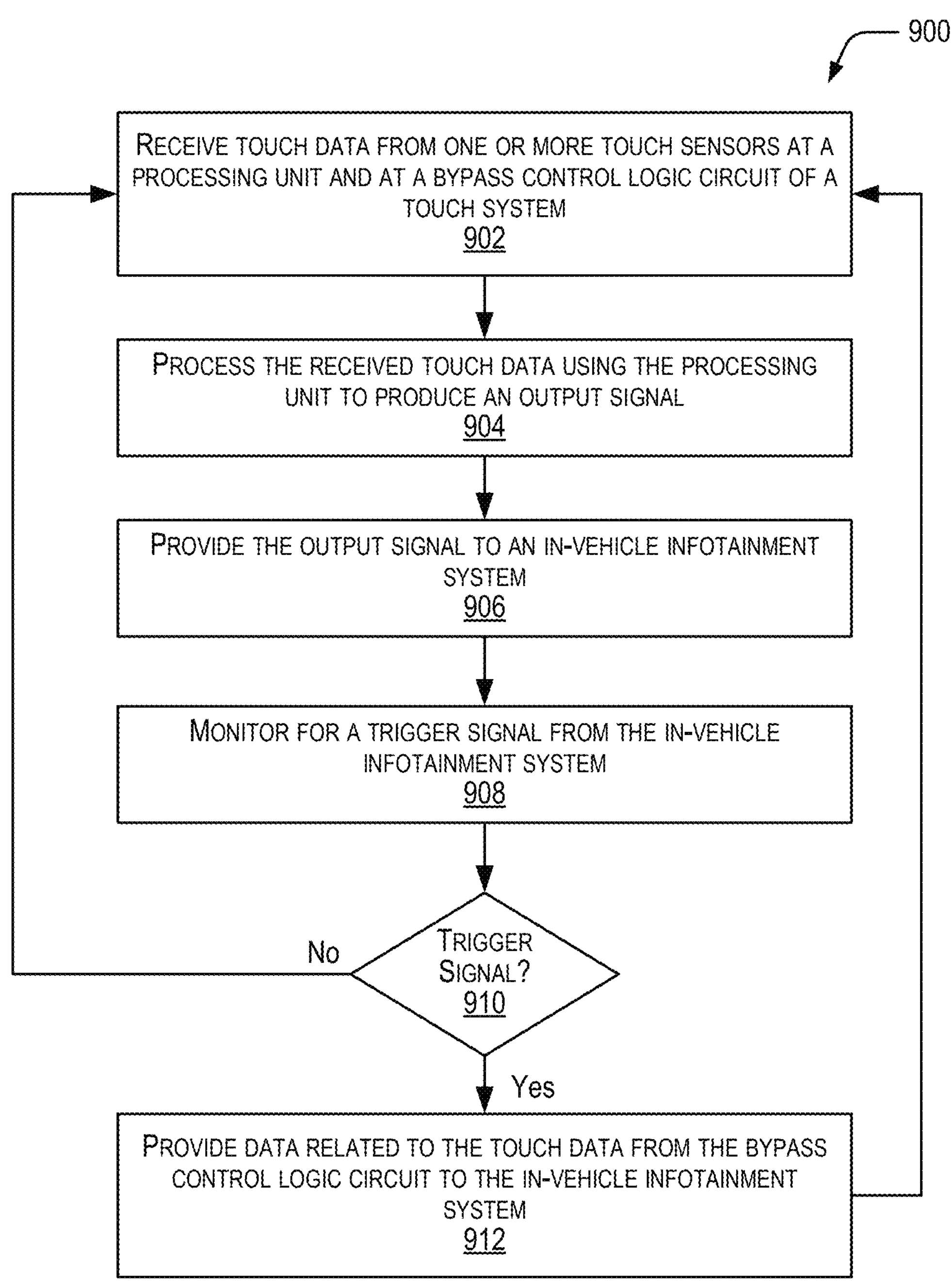
FIG. 9 depicts a block diagram of a method of bypassing a processing unit of a touch system in response to receiving a trigger signal from an in-vehicle infotainment system, in accordance with one or more embodiments.

FIG. 9 depicts a block diagram of a method 900 of bypassing a processing unit 102 of a touch system 101 in response to receiving a trigger signal from an in-vehicle infotainment system, in accordance with one or more embodiments. At 902, the method 900 may include receiving touch data from one or more sensors 104 at a processing unit 102 and at a bypass control logic circuit 112 of a touch system 101. The touch data may be sensor data provided by one or more sensors 104 to nodes 106 and 116 at the inputs to the processing unit 102 and the bypass control logic circuit 112, respectively.

At 904, the method 900 may include processing the touch data using the processing unit 102 to produce an output signal. The output signal may be formatted or packed to produce a data frame, a data packet, or another data format that is recognized by the IVI controller 120 or by another downstream device.

At 906, the method 900 may include providing the output signal to an in-vehicle infotainment system. The processing unit 102 may provide the output signal to the node 110, which may be coupled to the IVI controller 120.

At 908, the method 900 may include monitoring for a trigger signal from the in-vehicle infotainment system. In one or more embodiments, the bypass control logic circuit 112 may monitor for a trigger signal from a downstream component, such as an IVI controller 120, a main controller of a touch sensor board, or another downstream component.

At 910, if there is no trigger signal, the method 900 may return to 902 to receive touch data from one or more sensors 104. Otherwise, at 910, if there is a trigger signal, the method 900 may include providing data related to the touch data from the bypass control logic circuit 112 to the in-vehicle infotainment system, at 912. In one or more embodiments, the trigger signal may activate a switch 402 to provide the sensor data to the node 118, which may be coupled to the IVI controller 120.

It should be understood that the methods 700, 800, and 900 described above with respect to FIGS. 7-9 are provided for illustrative purposes only and are not intended to be limiting. Further, it should be appreciated that the methods 700, 800, and 900 of FIGS. 7, 8, and 9 may be combined without departing from the scope of the disclosure, enabling multiple possible triggers for bypassing the processing unit 102.

Figure 10:
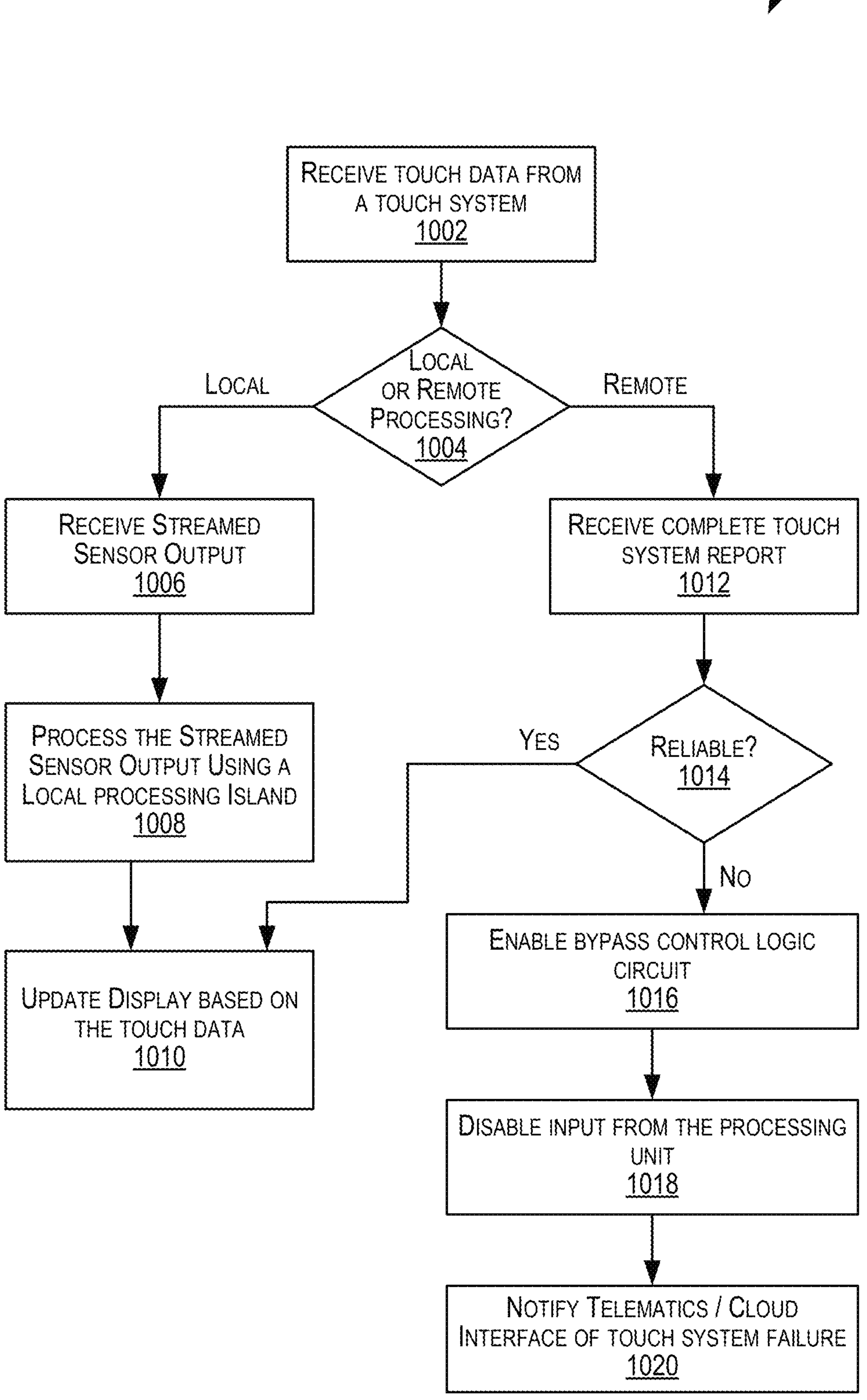
FIG. 10 depicts a block diagram of a method of processing touch data using one of a local processor of the in-vehicle infotainment system or one or more remote processors of the one or more touch systems, in accordance with one or more embodiments.

FIG. 10 depicts a block diagram of a method 1000 of processing touch data using one of a local processor of the in-vehicle infotainment system or one or more remote processors of the one or more touch systems 101, in accordance with one or more embodiments. In one or more embodiments, the local processor may include one or more processors 610 in FIG. 6, and the one or more remote processors may include the processing unit 102 of each of the touch systems 101.

At 1002, execution of the method 1000 may include receiving touch data from a touch system 101. The touch data may be received from the processing unit 102 via the node 110 or the bypass control logic circuit 112 via the node 118.

At 1004, the method 1000 may include determining whether processing is local or remote. The IVI controller 120 may default to remote processing and may switch to local processing in response to bypassing of the processing unit 102. In one or more embodiments, the IVI controller 120 may default to remote processing, but may select local processing when the received touch data is determined to be faulty. In one or more embodiments, the IVI controller 120 may determine the touch data is faulty when the processing unit 102 is disabled by the bypass control logic circuit 112, such as by disabling the output control circuit 202 to decouple the processing unit 102 from the node 110. The disabling of the processing unit 102 may be detected by the absence of data on the node 110 or alternatively based on the receipt of data from the bypass control logic circuit 112.

At 1004, if processing is local, the method 1000 may include receiving streamed sensor output 1006. The streamed sensor output may include sensor data produced by the one or more sensors 104 and provided to the node 118 by the bypass control logic circuit 112. The IVI controller 120 may discard data from the node 110 and may process the data from the bypass control logic circuit 112, which may include packetized, formatted, or streamed sensor data. In one or more embodiments, the data from the bypass control logic circuit 112 may be formatted or packed by an encoder. In one or more embodiments, the data from the bypass control logic circuit 112 may include raw sensor data. The sensor data may be raw sensor data that has been formatted or packed into a data frame, data packet, or other data protocol format that may be read by the IVI controller 120.

At 1008, the method 1000 may include processing the streamed sensor output using a local processing island. In one or more embodiments, the one or more processors 610 of the local processing system 602 of the IVI controller 120 may be configured to execute sensor data instructions 626 to determine touch input data from the streamed sensor output data.

At 1010, the method 1000 may include updating the display based on the touch data. In one or more embodiments, the touch data may indicate selections of one or more user-selectable control options, which may cause the IVI controller 120 to update the touchscreen 614 to present updated information.

Returning to 1004, if the processing is remote, the method 1000 may include receiving a complete touch system report 1012. In one or more embodiments, the processing unit 102 may process the received sensor data from the one or more sensors 104 to produce the complete touch system report, which may indicate one or more selections based on the sensor data.

At 1014, the method 1000 may include determining whether the touch system report is reliable. At 1014, if the report is reliable, the method 1000 may include updating the display with the touch data, at 1010. In one or more embodiments, the touch data may indicate selections of one or more user-selectable control options, which may cause the IVI controller 120 to update the touchscreen 614 to present updated information.

Otherwise, at 1014, if the report is not reliable, the method 1000 may include enabling the bypass control logic circuit 112, at 1016. The IVI controller 120 or another downstream component may assert a trigger signal at the node 302, activating the bypass control logic circuit 112.

At 1018, the method 1000 may include disabling input from the processing unit 102. In an embodiment, the bypass control logic circuit 112 may be configured to disable the output control circuit 202 to decouple the processing unit 102 from the node 110.

At 1020, the method 1000 may include notifying telematics or a cloud interface of the touch system 101 failure. In one or more embodiments, the local processing system 602 may communicate an error message to one or more computing system 606 through a communications network 604.

Conventionally, downstream processors typically rely on the output of the touch systems 101 until this output is considered faulty. In one or more embodiments, the touch systems 101 may be configured to selectively disable the processing unit 102 and utilize the bypass control logic circuit 112 to bypass the processing unit 102 to provide sensor data from the one or more sensors 104 to the IVI controller 120 or other downstream device. Alternatively, as indicated in methods 900 and 1000 of FIGS. 9 and 10, the IVI controller 120 may be configured to disregard the output of the processing unit 102 and to directly utilize the fail operation output of the bypass control logic circuit 112.

It should be understood that the methods described above with respect to FIGS. 7-10 are for illustrative purposes only and are not intended to be limiting. In one or more embodiments, the operations may be performed in a different order without departing from the scope of the disclosure.

In conjunction with the systems, methods, and circuits described herein with respect to FIGS. 1-10, a system may be configured to receive sensor data from one or more sensors at a processing unit of a touch system and at a bypass control logic circuit of the touch system. The processor unit may include an input coupled to the one or more sensors and an output coupled to a downstream device. The systems, methods, and circuit may be configured to determine an error corresponding to the processing unit and, in response to determining the error, selectively activate the bypass control logic circuit to provide the sensor data to the downstream device, bypassing the processing unit. The disclosure may be further understood in view of the following examples.

Example 1: A system may include one or more sensors 104 configured to produce sensor data; a processing unit 102 including an input coupled to the one or more sensors 104 and including an output configured to provide a sensor data report corresponding to the sensor data to a downstream device; and a bypass control logic circuit 112 circuit including a first input, a second input, and an output coupled to the downstream device, the first input coupled to the one or more sensors 104, the second input configured to receive a signal indicative of an error associated with the processing unit 102, and the bypass control logic circuit 112 configured to selectively provide the sensor data to the downstream device in response to receiving the signal.

Example 2: The system of Example 1, where the downstream device comprises an in-vehicle infotainment device. In one or more embodiments, the in-vehicle infotainment device may include or may be the IVI controller 120.

Example 3: The system of Example 1, where the processing unit 102 includes an error handler 122 configured to determine an error in the processing unit 102 and to provide the signal to the bypass control logic circuit 112 in response to determining the error.

Example 4: The system of any of Examples 1-3, where the second input of the bypass control logic circuit 112 is coupled to the downstream device to receive the signal indicative of the error.

Example 5: The system of any of Examples 1-4, may further include an output control circuit 202 including a first input coupled to the output of the processing unit 102, a control input coupled to the bypass control logic circuit 112, and an output coupled to the downstream device; and where the output control circuit 202 is responsive to an enable/disable signal from the bypass control logic circuit 112 to selectively decouple the output of the processing unit 102 from the downstream device.

Example 6: The system of Example 5, where the bypass control logic circuit 112 may include a trigger input coupled to the output of the processing unit 102 to receive output data; a counter or timer circuit 424 including a reset input and including a counter output configured to provide a timing indicator; a comparator 422 coupled to the trigger input, the comparator 422 including a second input coupled to the counter output of the counter or timer circuit 424 to receive the timing indicator, a third input configured to receive a threshold value 426, a first output coupled to the control input of the output control circuit 202 to selectively decouple the output of the processing unit 102 from the downstream device; and a second output; and a switch 402 including a first terminal configured to receive the sensor data from the one or more sensors 104, a control terminal coupled to the second output, and a second terminal coupled to the downstream device; where the comparator 422 resets the counter or timer circuit 424 in response to a change in the output data from the processing unit 102; and where, when the timing indicator exceeds the threshold value 426, the comparator 422 generates the first signal to deactivate the output control circuit 202 to decouple the processing unit 102 from the downstream device and generates the second signal to activate the switch 402 to selectively provide the sensor data to the downstream device.

Example 7: The system of Example 6, where the comparator 422 determines the error when the timing indicator exceeds the threshold value 426 before the change in the output data from the processing unit 102 causes the comparator 422 to reset the counter or timer circuit 424.

Example 8: The system of any of Examples 1-7, where the bypass control logic circuit 112 may include a data encoder circuit 404 configured to format the sensor data into one or more of a data frame or a data packet before sending the data frame or the data packet including the sensor data to the downstream device.

Example 9: A method may include receiving sensor data from one or more sensors at a processing unit 102 of a touch system 101 and at a bypass control logic circuit 112 of the touch system 101, the processing unit 102 including an input coupled to the one or more sensors 104 and including an output coupled to a downstream device; determining an error corresponding to the processing unit 102; and in response to determining the error, selectively activating the bypass control logic circuit 112 to provide the sensor data to the downstream device, bypassing the processing unit 102.

Example 10: The method of Example 9, where the downstream device comprises an in-vehicle infotainment device. In one or more embodiments, the in-vehicle infotainment device may include or may be the IVI controller 120.

Example 11: The method of any of Examples 9-10, where determining the error may include determining, using an error handler 122 of the processing unit 102, the error based on one or more of a data calculation error or a processor failure.

Example 12: The method of Example 11, where selectively activating the bypass control logic circuit 112 may include providing, using the error handler 122, a signal to activate the bypass control logic circuit 112 to provide the sensor data to the downstream device.

Example 13: The method of any of Examples 9-12, further including formatting or packing the sensor data, using a data encoder circuit 404, to produce one of a data frame or a data packet for providing the sensor data to the downstream device.

Example 14: The method of any of Examples 9-13, where determining the error may include receiving a signal indicative of the error at the bypass control logic circuit 112 from the downstream device.

Example 15: The method of any of Examples 9-14, further including deactivating an output control circuit 202 to decouple the processing unit from the downstream device in response to determining the error.

Example 16: The method of any of Examples 9-15, where determining the error may include monitoring output data at the output of the processing unit 102 using the bypass control logic circuit 112; determining, using the bypass control logic circuit 112, a timeout in the output data from the processing unit, the timeout indicating the error internal to the processing unit 102; and sending a first signal to an output control circuit 202 to decouple the processing unit 102 from the downstream device.

Example 17: The method of Example 16, further including sending a second signal to a switch 402 having a first terminal configured to receive the sensor data, a control terminal to receive the second signal, and a second terminal coupled to the downstream device, the second signal configured to activate the switch 402 to provide the sensor data from the first terminal to the second terminal.

Example 18: The method of Example 16, where determining the timeout may include resetting a counter or timer circuit 424 in response to receiving a change in the output data; comparing a value from the counter or timer circuit to a threshold value 426 using a comparator 422; and determining the timeout wherein the comparator 422 determines the value exceeds a threshold value 426 indicating that the output data has not changed for a period of time indicative of the timeout.

Example 19: A system may include a touch system 101 including: one or more touch sensors 1-4 configured to generate sensor data in response to sensing touch inputs; a processing unit 102 including an input coupled to the one or more sensors and including an output, the processing unit including an error handler 122 configured to determine a processor error, the processing unit 102 including an error signal output to provide an error signal; an output control circuit 202 including a first input coupled to the output of the processing unit 102, a second input, and a second output coupled to a downstream device; and a bypass control logic circuit 112 including: a third input coupled to the input of the processing unit 102 to receive the sensor data; a fourth input coupled to the error signal output to receive the error signal; a fifth input coupled to the output of the processing unit 102 to receive output data; a sixth input coupled to the downstream device to receive a trigger signal; a third output coupled to the second input of the output control circuit 202; and a fourth output coupled to the downstream device; and where the bypass control logic circuit 112 is configured to: determine an error based on one or more of the error signal, the output data, or the trigger signal; and in response to determining the error: apply a disable signal to the third output to deactivate the output control circuit 202; and activate a signal path between the third input and the fourth output to selectively bypass the processing unit 102 to provide the sensor data to the downstream device.

Example 20: The system of Example 19, where the bypass control logic circuit 112 further includes a data encoder circuit 404 including an input coupled to the fourth output and an output coupled to the downstream device, the data encoder circuit 404 configured to format or pack the sensor data into one or more of a data frame or a data packet for transmission to the downstream device.

The preceding detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

The foregoing description refers to elements or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with, electrically or otherwise) another element, and not necessarily mechanically. Thus, although the schematic shown in the figures depict one exemplary arrangement of elements, additional intervening elements, devices, features, or components may be present in an embodiment of the depicted subject matter.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments.

What is claimed is:

1. A system comprises:

one or more sensors configured to produce sensor data;

a processing unit including an input coupled to the one or more sensors and including an output configured to provide a sensor data report corresponding to the sensor data to a downstream device that is external to the processing unit; and a bypass control logic circuit including a first input, a second input, and an output coupled to the downstream device, the first input coupled to the one or more sensors, the second input coupled to at least one of the output of the processing unit, the downstream device, or a second output of the processing unit and configured to receive a signal indicative of an error associated with the processing unit, and the bypass control logic circuit configured to selectively provide the sensor data to the downstream device in response to receiving the signal.

2. The system of claim 1, wherein the downstream device comprises an in-vehicle infotainment device.

3. The system of claim 1, wherein the processing unit includes an error handler configured to determine an error in the processing unit and to provide the signal to the bypass control logic circuit via the second output of the processing unit in response to determining the error.

4. The system of claim 1, wherein the second input of the bypass control logic circuit is coupled to the downstream device to receive the signal indicative of the error.

5. The system of claim 1, further comprising:

an output control circuit including a first input coupled to the output of the processing unit, a control input coupled to the bypass control logic circuit, and an output coupled to the downstream device; and wherein the output control circuit is responsive to an enable/disable signal from the bypass control logic circuit to selectively decouple the output of the processing unit from the downstream device.

6. The system of claim 5, wherein the bypass control logic circuit comprises:

a trigger input coupled to the output of the processing unit to receive output data;

a counter or timer circuit including a reset input and including a counter output configured to provide a timing indicator;

a comparator coupled to the trigger input, the comparator including a second input coupled to the counter output to receive the timing indicator, a third input configured to receive a threshold value, a first output coupled to the control input of the output control circuit to selectively decouple the output of the processing unit from the downstream device; and a second output; and a switch including a first terminal configured to receive the sensor data from the one or more sensors, a control terminal coupled to the second output, and a second terminal coupled to the downstream device;

wherein the comparator resets the counter or timer circuit in response to a change in the output data from the processing unit; and wherein, when the timing indicator exceeds the threshold value, the comparator generates the first signal to deactivate the output control circuit to decouple the processing unit from the downstream device and generates the second signal to activate the switch to selectively provide the sensor data to the downstream device.

7. The system of claim 6, wherein the comparator determines the error when the timing indicator exceeds the threshold value before the change in the output data from the processing unit causes the comparator to reset the counter or timer circuit.

8. The system of claim 1, wherein the bypass control logic circuit comprises a data encoder circuit configured to format the sensor data into one or more of a data frame or a data packet before sending the data frame or the data packet including the sensor data to the downstream device.

9. A method comprising:

receiving sensor data from one or more sensors at a processing unit of a touch system and at a bypass control logic circuit of the touch system, the processing unit including an input coupled to the one or more sensors and including an output coupled to a downstream device that is external to the processing unit;

determining an error corresponding to the processing unit by at least one of an error handler of the processing unit, the bypass control logic circuit, or the downstream device; and in response to determining the error, selectively activating the bypass control logic circuit to provide the sensor data to the downstream device, bypassing the processing unit.

10. The method of claim 9, wherein the downstream device comprises an in-vehicle infotainment device.

11. The method of claim 9, wherein determining the error comprises determining, using the error handler of the processing unit, the error based on one or more of a data calculation error or a processor failure.

12. The method of claim 11, wherein selectively activating the bypass control logic circuit comprises providing, using the error handler, a signal to activate the bypass control logic circuit to provide the sensor data to the downstream device.

13. The method of claim 9, further comprising formatting or packing the sensor data, using a data encoder circuit, to produce one of a data frame or a data packet for providing the sensor data to the downstream device.

14. The method of claim 9, wherein determining the error comprises receiving a signal indicative of the error at the bypass control logic circuit from the downstream device.

15. The method of claim 9, further comprises deactivating an output control circuit to decouple the processing unit from the downstream device in response to determining the error.

16. The method of claim 9, wherein determining the error comprises:

monitoring output data at the output of the processing unit using the bypass control logic circuit;

determining, using the bypass control logic circuit, a timeout in the output data from the processing unit, the timeout indicating the error internal to the processing unit; and sending a first signal to an output control circuit to decouple the processing unit from the downstream device.

17. The method of claim 16, further comprising sending a second signal to a switch having a first terminal configured to receive the sensor data, a control terminal to receive the second signal, and a second terminal coupled to the downstream device, the second signal configured to activate the switch to provide the sensor data from the first terminal to the second terminal.

18. The method of claim 16, determining the timeout comprises:

resetting a counter or timer circuit in response to receiving a change in the output data;

comparing a value from the counter or timer circuit to a threshold value using a comparator; and determining the timeout wherein the comparator determines the value exceeds a threshold value indicating that the output data has not changed for a period of time indicative of the timeout.

19. A system comprising:

a touch system comprising:

one or more touch sensors configured to generate sensor data in response to sensing touch inputs;

a processing unit including an input coupled to the one or more sensors and including an output, the processing unit including an error handler configured to determine a processor error, the processing unit including an error signal output to provide an error signal;

an output control circuit including a first input coupled to the output of the processing unit, a second input, and a second output coupled to a downstream device; and a bypass control logic circuit including:

a third input coupled to the input of the processing unit to receive the sensor data;

a fourth input coupled to the error signal output to receive the error signal;

a fifth input coupled to the output of the processing unit to receive output data;

a sixth input coupled to the downstream device to receive a trigger signal;

a third output coupled to the second input of the output control circuit; and a fourth output coupled to the downstream device; and wherein the bypass control logic circuit is configured to:

determine an error based on one or more of the error signal, the output data, or the trigger signal; and in response to determining the error:

apply a disable signal to the third output to deactivate the output control circuit; and activate a signal path between the third input and the fourth output to selectively bypass the processing unit to provide the sensor data to the downstream device.

20. The system of claim 19, wherein the bypass control logic circuit further includes a data encoder circuit including an input coupled to the fourth output and an output coupled to the downstream device, the data encoder circuit configured to format or pack the sensor data into one or more of a data frame or a data packet for transmission to the downstream device.

* * * * *